United States Patent Office 3,211,620
Patented Oct. 12, 1965

3,211,620
STABILIZED ANTIPERSPIRANT-DEODORANT COMPOSITION
Hyman Henkin, Bayside, N.Y., and Ralph Paul Messina, Hackensack, N.J., assignors to Colgate-Palmolive Company, New York, N.Y., a corporation of Delaware
No Drawing. Filed Sept. 19, 1960, Ser. No. 56,696
7 Claims. (Cl. 167—90)

The present invention relates to a composition comprising neomycin, a nitrogen-containing organic compound which normally tends to inactivate neomycin upon aging in an aqueous medium at elevated temperatures and a soluble aluminum compound in an amount sufficient to inhibit said inactivation, as hereinafter described and claimed.

Neomycin is an anti-biotic material having known deodorant and anti-bacterial activity. It has been proposed to incorporate it in various costmetic compositions, including an antiperspirant composition containing aluminum chlorhydroxide for the purpose of obtaining improved deodorant properties.

Urea and similar nitrogen-containing organic compounds have been proposed for many uses in a variety of cosmetic compositions or the like, such as for solubilizing, anti-bacterial, hair-treating, buffering and anti-corrosive functions, etc. In antiperspirant compositions, urea has been employed as a buffering agent or fabric-corrosion inhibitor for reducing the corrosion or discoloration upon the ironing of clothing fabric due to the application of an aluminum astringent compound.

In the course of our research, it has been found that combinations containing neomycin and urea in an aqueous medium exhibit substantially reduced levels of neomycin activity after storage at elevated temperatures. This adverse effect is not in accord with the known stability of neomycin per se under such storage conditions and this inactivation can be considered as involving a number of possible factors. It was found ultimately that the development which appears to inactivate the neomycin results from the hydrolysis of the urea. While ammonia and carbon dioxide are normally the final decomposition products of urea upon heating in water, an intermediate product is the cyanate radical which has been confirmed as the causal factor in the inactivation.

In accordance with the present invention, it has now been found that there may be prepared compositions having improved stability and effectiveness upon aging at elevated temperatures which comprise neomycin, a nitrogen-containing organic compound such as urea which decomposes at elevated temperatures in an aqueous medium with release of a cyanate radical normally tending to inactivate neomycin, and an aluminum compound releasing aluminum ions in water, the proportion of said nitrogen-containing compound being correlated with the proportion of aluminum compound so as to markedly inhibit said inactivation. More particularly such compositions comprise neomycin, urea or the like and water-soluble aluminum astringent material in an aqueous medium, the proportions thereof being sufficient to exhibit effective antiperspirant, deodorant and fabric anti-corrosive properties upon aging at elevated and ambient temperatures for a prolonged period of time.

A preferred embodiment relates to a liquid composition containing effective amounts within the ranges of about 8 to 30% of aluminum chlorhydroxide, 0.1 to 0.5% of neomycin, 0.1 to 5% of urea or the like, and about 0.1 to 10% of a highly ionizable aluminum salt as a stabilizing agent, said composition maintaining an improved level of neomycin activity after aging, such as at elevated temperatures of the order of 120° F., compared to compositions free of said highly ionizable aluminum salt.

These compositions exhibit a high level of anti-bacterial, antiperspirant and deodorant activity also. Various other embodiments of the present invention will be apparent in the following description.

Neomycin is an antibiotic material which is known in the art and is described more fully in the book entitled, "Neomycin, Its Nature and Practical Application," by S. A. Waksman, Editor (1958), published for the Institute of Microbiology, Rutgers University, by the Williams & Wilkins Company, Baltimore, Maryland. The term includes the mixtures of several closely related neomycins known at neomycin B and neomycin C. In addition to the free base, the term is inclusive herein of the salts of such mixtures and the individual components thereof. Various inorganic and organic salts have been described in the art. It is preferred to use the salts of the mineral acids such as the neomycin sulfate and hydrochloride. Other salts such as the fatty acid salts, e.g., palmitate, are less water-soluble and may be used in appropriate liquid solvent mediums. The purity of the material is not considered critical and either the commercial, technical or the U.S. Pharmaceutical (USP) grades of neomycin sulfate, for example, may be used appropriately. The amount of neomycin (calculated as neomycin base) can vary as desired, but is an effective amount from about 0.05 to 2%, usually 0.1 to 0.5%, by weight of the composition.

The composition of the present invention comprises an organic nitrogen-containing compound which decomposes or hydrolyzes in an aqueous medium upon heating with the release or formation of cyanate or similar ion tending to reduce the activity of the neomycin, and a means to inhibit said inactivation. The nitrogen compound should have anti-corrosive or buffering properties to inhibit the corrosive or discoloration effect of aluminum compounds upon clothing fabrics. Various examples thereof can be found in U.S. Patent Nos. 2,586,287 and 2,586,288 issued February 19, 1952, to Apperson and Richardson. Examples of compounds tending to release cyanate or like ions are neutral amides such as urea, and thioamides such as thiourea and the like. These materials may be used in admixture with other known fabric corrosion inhibitors, such as glycine and the like.

The aluminum compound which is at least partially water-soluble serves to inhibit the adverse effect of the urea on neomycin activity upon aging at elevated temperatures. In general, the presence of the aluminum renders improved stability to the composition as compared to a similar composition free of the aluminum, and increased stability up to a miximum will be attained using increasing proportions of aluminum compared to the proportion of urea or the like. It is preferred to have present a highly ionizable aluminum salt which readily releases aluminum ions, particularly the aluminum salts of mineral acids, e.g., aluminum chloride and other halides, aluminum sulfate, or the like. Other aluminum salts are aluminum sulfamate, aluminum phosphate and aluminum phenolsulfonate. The reference herein to aluminum ions includes the hydrated or basic aluminum ions considered as existing in an aqueous medium. These ionizable aluminum salts may be added directly to the aqueous medium or may be formed in situ, such as by the addition of a mineral acid to an aluminum-containing solution. They are particularly effective in small amounts to neutralize or substantially inhibit the adverse effect of the urea upon the neomycin activity.

The data below illustrates the deleterious effect of urea upon the activity of the neomycin and the improvement offered by the addition of aluminum chloride, for example, when the compositions are subjected to accelerated aging tests at elevated temperatures as indicative of aging of the compositions at 120° F. for a prolonged time of the order of months. Composition A was prepared as a 0.175% aqueous solution of neomycin sulfate (technical grade—50% active); Composition B is the same as A but contains 2% urea, and Composition C is the same as Composition B with 1.5% of added aluminum chloride hexahydrate. The compositions were heated at the refluxing temperature (about 89° C.) for various time intervals and then each sample was analyzed for neomycin activity. In the table below, the percent of the original neomycin activity is given for Compositions B and C as determined after the stated time treatment at the elevated temperature, using Composition A containing only the neomycin as the standard.

TABLE

| Time Treatment at Elevated Temperature | Percent Activity of Original Neomycin Activity in Comp. A | |
|---|---|---|
| | Composition B | Composition C |
| None | No reduction | No reduction. |
| 2 hours | 23% | 96%. |
| 4 hours | | 83%. |

It is apparent from the above data that the urea has a detrimental effect on the activity of the neomycin in the Composition B under the conditions described whereas the Composition C containing a small amount of the added aluminum salt substantially retained the original neomycin activity.

Aluminum materials which are in complex form may be employed also such as aluminum chlorhydroxide (which has also been referred to as aluminum chlorhydroxide complex and basic aluminum chloride). In general, the commercial chlorhydroxide has an approximate atomic ratio of aluminum to chlorine of 2:1 (e.g., 2.1 to 1.9:1) and an empirical formula of $Al_2(OH)_5Cl$ in aqueous solution. The term aluminum chlorhydroxide includes herein other equivalent aluminum chlorhydroxy complexes and their salts. Such materials are known, e.g., aluminum chlorhydroxide ethylate complex, sodium aluminum chlorhydroxy lactate, and the like.

The inhibitory power of the aluminum chlorhydroxide complex upon the urea appears to be proportional to the amount of aluminum material present. It is not considered as a highly ionized material and it has been found that substantially larger amounts of aluminum chlorhydroxide are required to substantially stabilize the activity of the neomycin upon aging at elevated temperatures, as compared to the effect of aluminum chloride. In similar aging tests as described above, increasingly improved neomycin activity in the presence of the 2% urea was obtained using increasing amounts of aluminum chlorhydroxide from about 12 to 22% solids by weight in the solution. Where the amount of aluminum chlorhydroxide is maintained constant but lesser amounts of urea are employed, there is obtained improved neomycin activity also.

The proportions of the aluminum compound should be correlated with the urea or the like, therefore, so that the composition exhibits the desired stability after aging at elevated temperatures. As indicated, the specific proportions will vary with the type of aluminum material but the ratio of aluminum material to the urea should be greater than 1:1 by weight and sufficient to achieve the desired stabilizing effect.

Other factors to be correlated are the amount of aluminum astringent material which should be sufficient, in combination with the neomycin, to produce effective antiperspirant and deodorant properties and the amount of urea or similar fabric-corrosion inhibitor which should be sufficient so that the composition does not exhibit any significant damage to clothing fabrics such as cellulosic materials upon application thereto.

In general, the amount of total aluminum material will be within the range of 5 to 40% and preferably from about 8 to 30% by weight of the composition (the aluminum material being calculated as an anhydrous material). It will be understood that the aluminum compound will be proportioned so as to be dissolved and retained in the liquid or solvent medium of the composition. The urea or similar fabric-inhibitor will be employed in an effective amount and is usually a minor proportion, such as within the range of about 0.1 to 5%, preferably 0.1 to 2%, by weight of the composition.

The preferred composition comprises aluminum astringent material containing a mixture of a major proportion of aluminum chlorhydroxide and a minor proportion of a highly ionizable aluminum salt such as aluminum chloride. The aluminum chlorhydroxide solids content is preferably 8 to 30% of the composition and the aluminum normal salt is usually up to about 10%, and preferably from 0.1 to 5%, by weight of the composition. There is thus present a substantial amount of aluminum material which requires relatively small amounts of a fabric corrosion inhibitor since the aluminum chlorhydroxide is considered less astringent than the aluminum chloride. The presence of the small amount of aluminum chloride, however, is sufficient to yield a high degree of stability to the composition in the presence of the urea so that the neomycin is not substantially inactivated after aging at 120° F. for many months.

In compositions containing an aqueous medium, the solvent can be water or an aqueous alcoholic solution. It may contain varying amounts of a water-soluble or miscible saturated lower aliphatic alcohol such as ethanol isopropanol, propylene glycol or the like, if desired. In a liquid product, it is preferred to employ a minor proportion of an alcohol, preferably ethanol, in an amount from about 5 to 30% by weight of the composition to aid in fast drying of the product after application and in the solubilization of certain materials such as water-insoluble perfume and the like. It will be understood that the water and alcohol and any other ingredients in the solvent medium should be proportioned so as to form a homogeneous or uniform solvent medium effective to dissolve or solubilize the aluminum material, neomycin, the urea or the like, the gum if employed, etc.

In general, the mixture containing the aluminum compound, neomycin and inhibitor in the aqueous medium may be prepared in any suitable form. It is preferred to utilize it in the form of a liquid (including clear solutions and emulsion types). Such liquid may be adapted for various methods of application. It may be dispensed or applied by means of a roll-on applicator, by spraying from a squeeze bottle, by use of propellant gas from a valved container commonly known as an aerosol type or by use of fingers or an instrument. The viscosity of the liquid will be adjusted so as to achieve the desired flow for the particular means of dispensation.

Thus, it is desirable in certain instances to incorporate a gum or gum-like material in order to have a more viscous flow. For example, liquid compositions designed for application by use of a roll-on apparatus must flow from a reservoir to a passage between the ball and the adjacent wall or neck of the container. The viscosity of the liquid should be controlled taking into consideration the clearance of the passage so that the product flows in a smooth manner without dripping or gelling of the product. Any suitable gum may be employed, particularly a cellulosic compound such as a methyl ether of cellulose. In general, the amount of thickening agent used, depending upon its thickening power, is within the range of about 0.1 to 2% by weight.

It is a further feature of the present invention to employ an hydroxypropyl methyl cellulose, particularly one having a methoxy content of about 25% and an hydroxypropoxy content of about 5%. A preferred material has a methoxy content of 24.6–25.4%, an hydroxypropoxy content of 4.8–5.4% and a viscosity of about 1200 to 1800 centipoises in 2% solution in water at 20° C. It has been found that, using such gum material, the liquid product is more stable physically at elevated temperatures without undue clouding or separation.

Any suitable surface-active agent may be incorporated in the product also which is compatible in said liquid. It is desirable to include a water-soluble non-ionic surface-active agent in the composition. Such material possesses dispersing or solubilizing properties in the solvent medium, e.g., solubilization of insoluble perfumes, and contributes increased wetting characteristics. It is employed in a minor amount in the solution which is usually within the range of about ¼ to 2% by weight of the composition.

The preferred surface-active agents contain usually a long-chain aliphatic hydrophobic organic group, e.g., having at least about 5 and usually about 8 to 30 carbon atoms, condensed with an alkylene oxide of about 2–4 carbons in an amount sufficient to render the product water-soluble, and usually within the range of about 5 to 100 alkylene oxide groups. Suitable examples are polyethyleneoxide ethers of an alkyl phenol or a higher aliphatic alcohol. The alkyl phenol ethers usually have about 6 to 15 carbons in the alkyl group and about 5 to 20 moles of ethylene oxide, specific examples of which are Igepal CO–630 and 710. The polyethylene oxide condensates, preferably having about 6 to 30 moles, with a fatty alcohol of 8 to 22 carbons such as lauryl, tridecyl, myristyl, cetyl and stearyl alcohols, may be used also. A typical product is a fatty alcohol of 12 to 14 carbons condensed with about 10 moles of ethylene oxide.

As indicated, various adjuvant materials may be incorporated in the compositions in suitable amounts. Thus, the product will ordinarily contain perfume and coloring material which should be compatible therewith. Minor amounts of materials considered as having an emollient effect, such as glycerine, allantoin, and lanolin derivatives such as a water-soluble acetylated ethoxylated lanolin derivative, may be incorporated therein.

There may be included a suitable ultra-violet absorber in the product, if desired, to inhibit fading of the color of the composition in sunlight. Any suitable ultra-violet absorber compatible and soluble in the liquid medium may be employed. In general, they are substantially invisible when applied to human tissue. It is preferred to employ ultra-violet absorbers having a 2-hydroxy benzophenone group or nucleus, and particularly 2,2'-,4,4'-tetrahydroxy benzophenone.

Other materials which may be added include preservative, additional anti-bacterial materials, opacifying agents such as cetyl alcohol or the like in compatible amounts to form an opaque liquid, silicone fluids, etc.

The liquid composition may be admixed with a propellant material and dispensed as an aerosol. Any suitable normally gaseous substance may be employed in known manner such as the liquefied normally gaseous low molecular weight aliphatic hydrocarbons, e.g., mixture of propane and isobutane, and halogenated hydrocarbon propellants known in the art as the "Genetrons" and "Freons" which dispense the product in the form of a mist or spray. Other inert propellant materials which dispense the product as a viscous liquid from a valved container rather than as a spray may be employed also, such as nitrogen or the like.

In the manufacture of a cream, suitable fatty material and an emulsifying agent will be combined with the aluminum compound, neomycin and fabric-corrosion inhibitor in water to form an aqueous phase and an oily or fatty phase which are combined in the form of a cream. Suitable fatty and emulsifying materials may be selected from those disclosed in said U.S. Patents Nos. 2,586,287 and 2,586,288.

The following examples are further illustrative of the nature of the present invention and it is to be understood that the invention is not limited thereto. All amounts are by weight unless otherwise indicated.

*Examples I–V*

| Ingredients | I | II | III | IV | V |
|---|---|---|---|---|---|
| Aluminum chlorhydroxide | 12.5 | 22 | 22 | 24 | 24 |
| Aluminum chloride hexahydrate | | | 1.0 | | 1.5 |
| Neomycin | 0.175 | 0.175 | 0.175 | 0.175 | 0.175 |
| Urea | 0.5 | 1.0 | 2.0 | 1.0 | 2.0 |
| Ethyl alcohol | 17.5 | 17.5 | 17.5 | 17.5 | 17.5 |
| Surface-active agent | 1.0 | 1.0 | 1.0 | 1.0 | 1.0 |
| Gum | 0.65 | 0.65 | 0.65 | 0.65 | 0.65 |
| Allantoin | 0.1 | 0.1 | 0.1 | 0.1 | 0.1 |
| Glycerine | 3.0 | 3.0 | 3.0 | 3.0 | 3.0 |
| Water | Bal. | Bal. | Bal. | Bal. | Bal. | with minor amounts of perfume, color, water-soluble lanolin derivative and ultra-violet absorber.

The compositions are prepared by blending the ethyl alcohol (S.D. 40), perfume and surface-active agent (Igepal CO–630), warming the mixture, and slowly adding the gum (hydroxypropyl methylcellulose) with stirring for a sufficient time to permit swelling of the gum and form a homogeneous solution. The major part of the water is then added and the remaining ingredients are added slowly in any desired order to the warmed solution with stirring. The 0.175% neomycin is calculated on the amount of base present and is a technical grade (50% active) of neomycin sulfate which is added in the form of a powder with stirring. The amount of aluminum chlorhydroxide indicated is on a solids basis and it is added in the form of an approximate 50% aqueous solution to form a clear homogeneous liquid and the aluminum chloride is added in powder form. The products of Examples I, II and IV have a pH of about 4.2 and the products of Examples III and V containing a minor proportion of aluminum chloride have a pH of about 3.8. All of these liquid products are particularly suitable for use in a roll-on applicator.

These compositions are highly effective in the reduction of perspiration and auxiliary odor, and for anti-bacterial activity. The use of these products results in considerable reduction in axillary odor and a relatively low bacterial count with the effects being noticeable for several days after use.

All of the products are stable upon aging at ambient temperatures and under cold temperature conditions, e.g., 40° F., and under elevated temperatures, e.g., 120° F. for long periods of time.

*Example VI*

A typical formulation for a cream is—

| Ingredients: | Percent |
|---|---|
| Aluminum chlorhydroxide | 18 |
| Glyceryl monostearate | 11 |
| N (lauroyl colamino formyl methyl) pyridinium chloride | 1 |
| Urea | 2.5 |
| Neomycin in form of sulfate salt | 0.175 | with the balance being primarily water, and small amounts of perfume, emollient materials, preservative, etc.

The present application is a continuation-in-part of application Serial No. 35,893 filed June 14, 1960.

Although the present invention has been described with reference to particular embodiments and examples, it will be apparent to those skilled in the art that variations and modifications of this invention can be made and that equivalents can be substituted for various ingredients without departing from the principles and true spirit of the invention.

Having thus described the invention, what is claimed is:

1. A composition comprising an aluminum astringent compound, neomycin, and a minor proportion of an organic nitrogen-containing fabric-corrosion inhibitor which decomposes upon aging in an aqueous medium at elevated temperature with the release of cyanate material normally tending to inactivate neomycin, the proportion of said aluminum astringent compound being sufficient to inhibit said inactivation, said aluminum astringent being present in a ratio of greater than 1:1 with respect to the fabric corrosion inhibitor.

2. An antiperspirant-deodorant composition comprising 8 to 30% by weight of aluminum chlorhydroxide, 0.1 to 10% by weight of an aluminum salt of a mineral acid, 0.1 to 0.5% by weight of neomycin and 0.1 to 5% by weight of urea.

3. An antiperspirant-deodorant composition in the form of a liquid comprising 8 to 30% by weight of aluminum chlorhydroxide, 0.05 to 2% by weight of neomycin, 0.1 to 5% by weight of urea and 0.1 to 10% by weight of a highly ionizable aluminum salt in an aqueous solvent medium.

4. A liquid antiperspirant-deodorant composition comprsing 8 to 30% by weight of aluminum chlorhydroxide, 0.1 to 0.5% by weight of neomycin base in the form of neomycin sulfate, 0.1 to 5% by weight of urea, and about 0.1 to 5% by weight of a highly ionizable aluminum salt of a mineral acid in an aqueous alcoholic solvent medium containing 5 to 30% by weight of a water-soluble lower aliphatic saturated alcohol.

5. A liquid antiperspirant-deodorant composition which is particularly suitable for use in a roll-on applicator comprising 8 to 30% by weight of aluminum chlorhydroxide, 0.1 to 0.5% by weight of neomycin in the form of its sulfate salt, 0.1 to 2% by weight of urea, 0.1 to 5% by weight of aluminum chloride and 0.1 to 5% by weight of a water-soluble non-ionic surface-active agent in an aqueous alcoholic medium containing 5 to 30% by weight of ethanol.

6. An antiperspirant-deodorant composition comprising 5 to 40% by weight of aluminum astringent material, 0.05 to 2% by weight of neomycin in the form of its water-soluble inorganic salt, and 0.1 to 5% by weight of an organic nitrogen-containing fabric-corrosion inhibitor which decomposes upon aging in an aqueous medium at elevated temperature with the release of cyanate material normally tending to inactivate neomycin, said aluminum material being present in a total ratio greater than 1:1 with respect to the fabric-corrosion inhibitor and comprising a major portion of aluminum chlorohydroxide and a minor portion of a highly ionizable aluminum salt in an amount sufficient to substantially inhibit said inactivation.

7. An antiperspirant-deodorant composition comprising 8 to 30% by weight of aluminum chlorhydroxide, 0.1 to 10% by weight of an aluminum salt of a mineral acid, 0.1 to 0.5% by weight of neomycin and 0.1 to 5% by weight of urea and 0.1 to 2% by weight of hydroxypropyl methyl cellulose.

References Cited by the Examiner

UNITED STATES PATENTS

| | | | |
|---|---|---|---|
| 2,230,082 | 1/41 | Montenier | 167—90 |
| 2,236,387 | 3/41 | Wallace | 167—90 |
| 2,814,584 | 11/57 | Daley | 167—90 |
| 2,955,983 | 10/60 | Messina | 167—90 |

FOREIGN PATENTS 984,210  7/51  France.

OTHER REFERENCES

Consumer Reports, volume 24, No. 7, page 380, July 1959.

Hilfer, Drug and Cosmetic Industry, volume 70, No. 5, pages 606–607, May 1952.

Robinson, Bulletin of the School of Medicine of the University of Maryland, 42:5, October 1957, pages 72–74.

JULIAN S. LEVITT, *Primary Examiner.*

WILLIAM B. KNIGHT, MORRIS O. WOLK, LEWIS GOTTS, *Examiners.*